(12) United States Patent
Savalia et al.

(10) Patent No.: US 10,371,282 B2
(45) Date of Patent: Aug. 6, 2019

(54) SHAFT BLOWOUT PREVENTION DEVICE

(71) Applicant: Mueller International, LLC, Atlanta, GA (US)

(72) Inventors: Purushottam Savalia; Ashraf Abouelleil, Oswego, IL (US); Julian Ramirez, Aurora, IL (US)

(73) Assignee: Mueller International, LLC, Atlanta, GA (US)

( * ) Notice: Subject to any disclaimer, the term of this patent is extended or adjusted under 35 U.S.C. 154(b) by 37 days.

(21) Appl. No.: 15/627,815

(22) Filed: Jun. 20, 2017

(65) Prior Publication Data

US 2017/0370181 A1    Dec. 28, 2017

Related U.S. Application Data

(60) Provisional application No. 62/353,377, filed on Jun. 22, 2016.

(51) Int. Cl.
| | | |
|---|---|---|
| F16K 1/22 | (2006.01) | |
| F16K 27/02 | (2006.01) | |
| F16K 31/14 | (2006.01) | |

(52) U.S. Cl.
CPC ............ *F16K 31/14* (2013.01); *F16K 1/221* (2013.01); *F16K 1/224* (2013.01); *F16K 27/0218* (2013.01)

(58) Field of Classification Search
CPC .......... F16K 1/221; F16K 1/224; F16K 31/14; F16K 27/0218; F16K 31/1635; E21B 34/045; E21B 33/06; E21B 33/085
USPC ............ 251/305, 304, 315.08, 315.09, 315.1
See application file for complete search history.

(56) References Cited

U.S. PATENT DOCUMENTS

| | | | | | |
|---|---|---|---|---|---|
| 3,199,876 | A | * | 8/1965 | Magos | F16J 15/181 251/355 |
| 3,456,916 | A | * | 7/1969 | Hutchens | F16K 5/0642 251/309 |
| 3,548,858 | A | * | 12/1970 | Wolfensperger | F16K 5/0673 137/246.15 |
| 3,612,483 | A | * | 10/1971 | Pool | F16K 1/226 251/306 |
| 4,428,561 | A | * | 1/1984 | Thompson | F16K 5/0678 251/171 |
| 4,566,482 | A | * | 1/1986 | Stunkard | F16K 5/0636 137/240 |
| 4,773,625 | A | * | 9/1988 | Calvin | F16K 1/2261 228/165 |
| 5,370,361 | A | * | 12/1994 | Mendell | F16K 1/22 251/305 |

(Continued)

OTHER PUBLICATIONS

United States Environmental Protection Agency, et al.; Article entitled: "Shaft Blow-out Hazard of Check and Butterfly Valves", Sep. 1997, 4 pgs.

(Continued)

*Primary Examiner* — Kevin F Murphy
*Assistant Examiner* — Kelsey E Cary
(74) *Attorney, Agent, or Firm* — Taylor English Duma LLP (57) ABSTRACT

A valve includes a valve body defining a top end, a bottom end distal from the top end, and a shaft bore defined in the top end and the bottom end; a valve shaft positioned at least partially within the shaft bore of the valve body and defining an end bore; and a shaft blowout prevention fastener secured within the end bore of the valve shaft.

19 Claims, 5 Drawing Sheets

(56) References Cited

U.S. PATENT DOCUMENTS

2009/0184276 A1* 7/2009 Olberding ................. F16K 1/16
                                                    251/313
2016/0123473 A1* 5/2016 Sisk ........................ F16K 1/224
                                                    251/305

OTHER PUBLICATIONS

Henry Pratt Company; Brochure entitled: "ISO Butterfly Valves DN100 through DN4000", 2010 Copyright, 28 pgs.

* cited by examiner

SHAFT BLOWOUT PREVENTION DEVICE

REFERENCE TO RELATED APPLICATIONS

This application claims the benefit of U.S. Provisional Application No. 62/353,377, filed Jun. 22, 2016, which is hereby specifically incorporated by reference herein in its entirety.

TECHNICAL FIELD

Field of Use

This disclosure relates to valves used in fluid systems. More specifically, this disclosure relates to valve shaft blowout prevention devices.

Related Art

Certain types of valves, including check valves or butterfly valves in fluid systems, can comprise a valve shaft to actuate a mechanism for opening and closing the valve or otherwise adjusting a flow rate through the valve. Mechanisms for actuating can comprise, for example, a valve disc. Such a valve can undergo shaft-disc separation by failing at a mechanical connection between the valve shaft and the valve disc, which can be caused by or accompanied by a failure or degradation of another component of the valve such as a shaft seal of the valve. Such failure can cause "blowout" of the valve shaft. The valve shaft can cause damage and injury to persons and property around the valve due to the high rate of speed at which the valve shaft can "blowout" from the valve. The blowout can also result in a fire or an explosion if the fluid or the vapor in the fluid system is flammable or explosive. Such failure can be due to wear on the valve over time and can occur even when the valve is operated within its design limits of pressure and temperature.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a valve comprising: a valve body defining a top end, a bottom end distal from the top end, and a shaft bore defined in the top end and the bottom end; a valve shaft positioned at least partially within the shaft bore of the valve body and defining an end bore; and a shaft blowout prevention fastener secured within the end bore of the valve shaft.

In a further aspect, disclosed is a shaft blowout prevention device comprising: a valve shaft configured to be installed within a shaft bore of a valve body of a valve, the valve shaft defining an end bore; a shaft blowout prevention fastener secured within the end bore of the valve shaft; and a bottom cover configured to be assembled to the valve body and positioned at least partially between the valve shaft and the shaft blowout prevention fastener.

In yet another aspect, disclosed is a method of manufacturing a valve, the method comprising: inserting a valve shaft at least partially within a shaft bore of a valve body, the valve body defining a top end, a bottom end distal from the top end, and the shaft bore defined in the top end and the bottom end; and securing a shaft blowout prevention fastener to an end of the valve shaft; and blocking removal of the valve shaft from and through the top end of the valve body with the shaft blowout prevention fastener.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known embodiments. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can include two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements of the valve disclosed herein, the conventions of "top," "bottom," "inner," "outer," "inside," or "outside," may be referenced. Unless stated otherwise here or in the figures, "top" describes that side or end of the valve that is facing upward as shown in the figures and "bottom" is that side or end of the valve that is opposite or distal the top of the valve and is facing downward as shown in the figures. Likewise, "outer" describes that side of the valve that is facing outward and "inner" is that side of the valve that is facing inward.

In one aspect, a shaft blowout prevention device and associated methods, systems, devices, and various apparatuses are disclosed herein. In one aspect, the device can comprise a shaft blowout fastener secured to a valve shaft.

Figure 1:
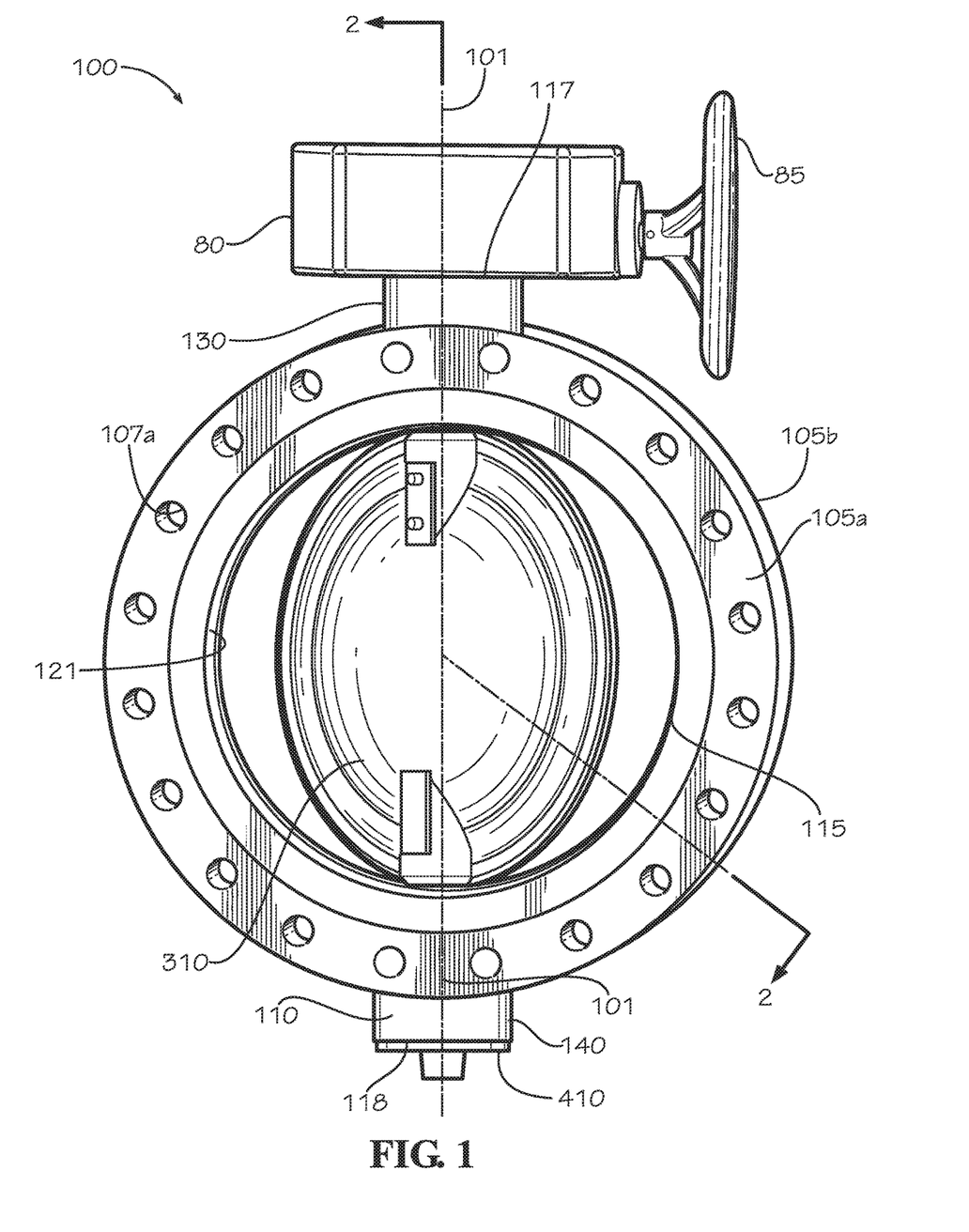
FIG. 1 is a side view of a valve comprising a shaft blowout prevention device in accordance with one aspect of the current disclosure.

FIG. 1 discloses a valve 100. In one aspect, the valve 100 can be a butterfly valve. In other aspects, the valve 100 can be one of various other types of valves including, but not limited to, a ball valve, a plug valve, or a cone valve, which can be configured to seal against an internal fluid pressure of as much as 200 psig or higher. In one aspect, the valve 100 can be a butterfly valve having a single-shaft or through-shaft design. The fluid itself can be any one of a number of different fluid media including a gas such as air or a liquid such as water. The fluid can be flammable, non-flammable, explosive, or non-explosive.

Figure 2:
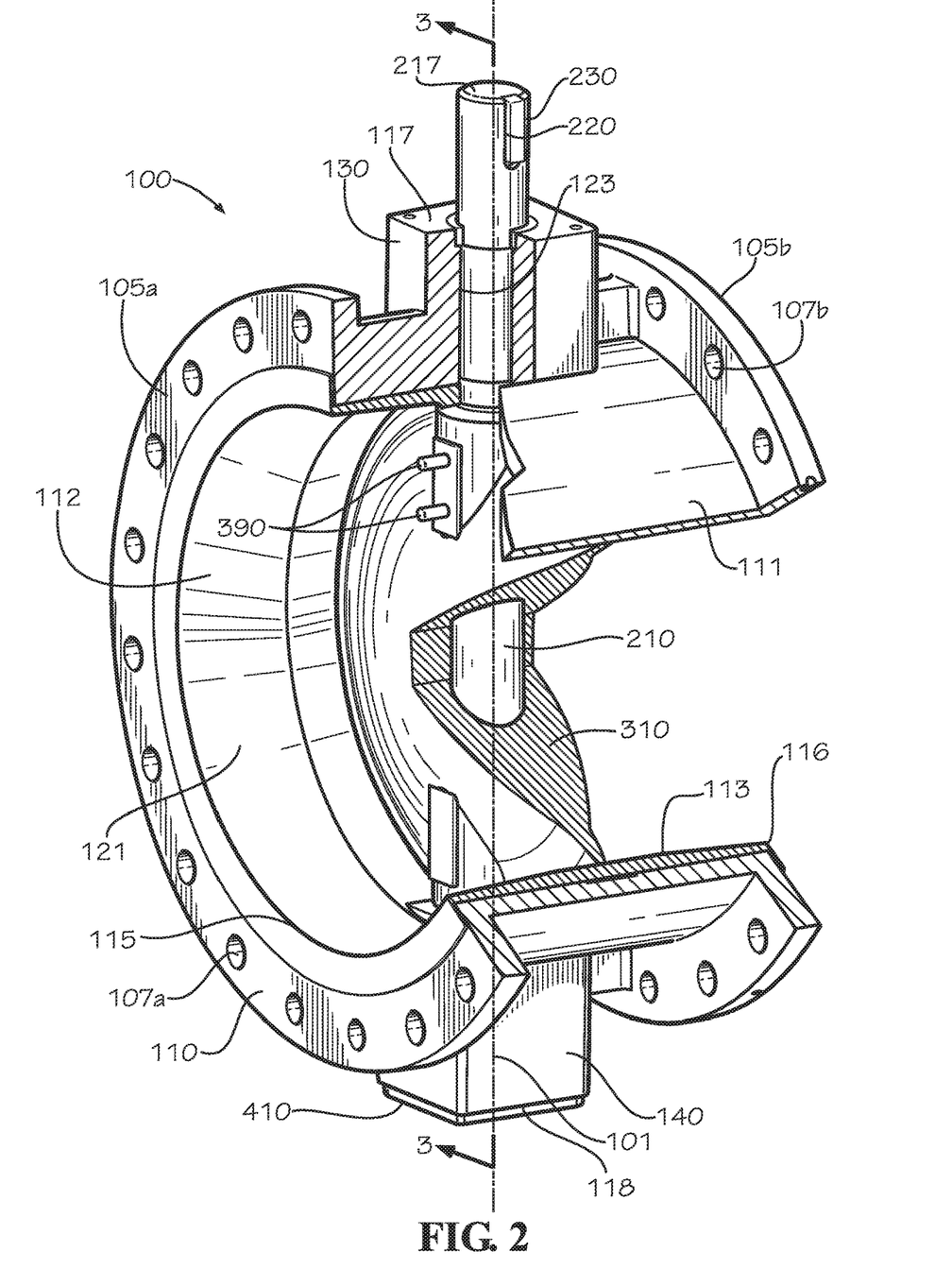
FIG. 2 is a perspective cutaway view of the valve of FIG. 1 taken along line 2-2 of FIG. 1.

In one aspect, the valve 100 can comprise a valve body 110 and a valve shaft 210 (shown in FIG. 2). The valve 100 can further comprise a valve disc 310 positioned within a fluid bore 121 of the valve body 110, through which fluid can pass. The valve 100 can further comprise an actuator 80 for rotating the valve shaft 210 within the valve body 110 to turn the valve disc 310 and thereby open or close the valve 100 or to otherwise the adjust the flow of fluid through the valve 100. The valve body 110, the valve shaft 210, and the valve disc 310 can be aligned along a vertical axis 101 during assembly of the valve 100. In one aspect, the actuator 80 can comprise either a handwheel operator 85 as shown, a lever operator (not shown), or a gear operator (not shown). In another aspect, the valve 100 can be made to open or close by pneumatic or electrical power.

In one aspect, as in a typical butterfly valve, the valve disc 310 of the valve 100 can be configured to rotate a quarter of a turn between a fully open position and a fully closed position. In a typical butterfly valve, a radial cross-section of a valve disc such as the valve disc 310 can be configured to remain in the path of the fluid traveling through the valve 100 even when the valve 100 is open. In another aspect, the type of valve, the rotation angle or rotation angle range, or the particular valve configuration can differ from that shown.

The valve body 110 can define an inlet 115, an outlet 116 (shown in FIG. 2) distal from the inlet 115, a top end 117, a bottom end 118 distal from the top end 117, the fluid bore 121 defined between the inlet 115 and the outlet 116, and a shaft bore 123 (shown in FIG. 2) defined in the top end 117 and the bottom end 118. In one aspect, the shaft bore 123 comprises a first portion 124 (shown in FIG. 3) defined in the top end 117 of the valve body 110 and a second portion 125 (shown in FIG. 3) defined in the bottom end 118 of the valve body 110. In one aspect, the fluid bore 121 and the shaft bore 123 can be cylindrical in shape.

In one aspect, as shown in FIGS. 1 and 2, the valve body 110 can be a "flanged" type valve body comprising an attachment flange 105a,b on each axial end of the valve 100 for attaching the valve to a piping system. In such aspect, each of the attachment flanges 105a,b can respectively define a plurality of attachment holes 107a,b through which a plurality of fasteners, including but not limited to nuts and bolts, can secure the valve 100 to the piping system. The valve body 110 may also be constructed as, for example and without limitation, a "lugged" type, a "wafer" type, or a "butt-weld" type valve. A "lugged" type valve comprises multiple lugs through which a plurality of fasteners can secure the valve 100 to the piping system, and a "wafer" type valve comprises neither lugs nor attachment flanges but is sandwiched between opposing flanges on the adjacent piping components of the piping system in which it is installed. A "butt-weld" type valve does not require fasteners for assembly to the piping system but is instead welded in place.

As shown in FIG. 2, the valve body 110 can further comprise an outer surface 111 and an inner surface 112. In one aspect, the valve body 110 can comprise a liner 113 lining the fluid bore 121 of the valve body 110 and thereby defining the inner surface 112 against which the valve disc 310 can seal. In one aspect, the valve body 110 can further comprise a top trunnion 130 and a bottom trunnion 140. In one aspect, the actuator 80 can be assembled to the top trunnion 130. In another aspect, a bottom cover 410 can be assembled to the bottom trunnion 140 with a plurality of fasteners 490 (shown in FIG. 3) extending through a plurality of attachment bores 418. In another aspect, the bottom cover 410 can be assembled to the bottom trunnion 140 by other methods, such as by a single fastener 490 or by welding.

The valve body 110 can be cast from any one or more of a number of different metals or metal alloys including, for example and without limitation, stainless steel, carbon steel, ductile iron, and various steel and non-steel alloys including INCOLLOY alloys, MONEL alloys, HASTELLOY alloys, INCONEL alloys, and chrome moly alloys. The valve body 110 can also be machined.

In one aspect, the valve shaft 210 can be positioned at least partially within the shaft bore 123 of the valve body 110. For example and without limitation, a portion of the valve shaft 210 proximate to a top end 217 of the valve shaft 210 can be positioned within the first portion 124 of the shaft bore 123, and a portion of the valve shaft 210 proximate to a bottom end 218 (shown in FIG. 3) of the valve shaft 210 can be positioned within the second portion 125 of the shaft bore 123. In another aspect, the valve 100 can comprise an upper valve shaft (not shown) positioned at least partially within the first portion 124 of the shaft bore 123 of the valve body 110 and secured to a top of the valve disc 310 and a lower valve shaft (not shown) can be positioned within the second portion 125 of the shaft bore 123 and secured to the bottom of the valve disc 310.

In one aspect, the valve shaft 210 can be coupled to the valve disc 310 with a fastener 390 such as, for example and without limitation, a press-fit shaft pin. In another aspect, the valve shaft 210 can be coupled to the valve disc 310 with more than one fastener 390. The valve shaft 210 can define a pin bore 295—or multiple pin bores 295, which can each be sized to receive one of the fasteners 390. Likewise, the valve disc 310 can define a pin bore 395—or multiple pin bores 395, which can each be sized to receive a one of the fasteners 390. The valve shaft 210 can further define a keyway 220 that is sized to receive a key 230 for engagement with the actuator 80.

Figure 3:
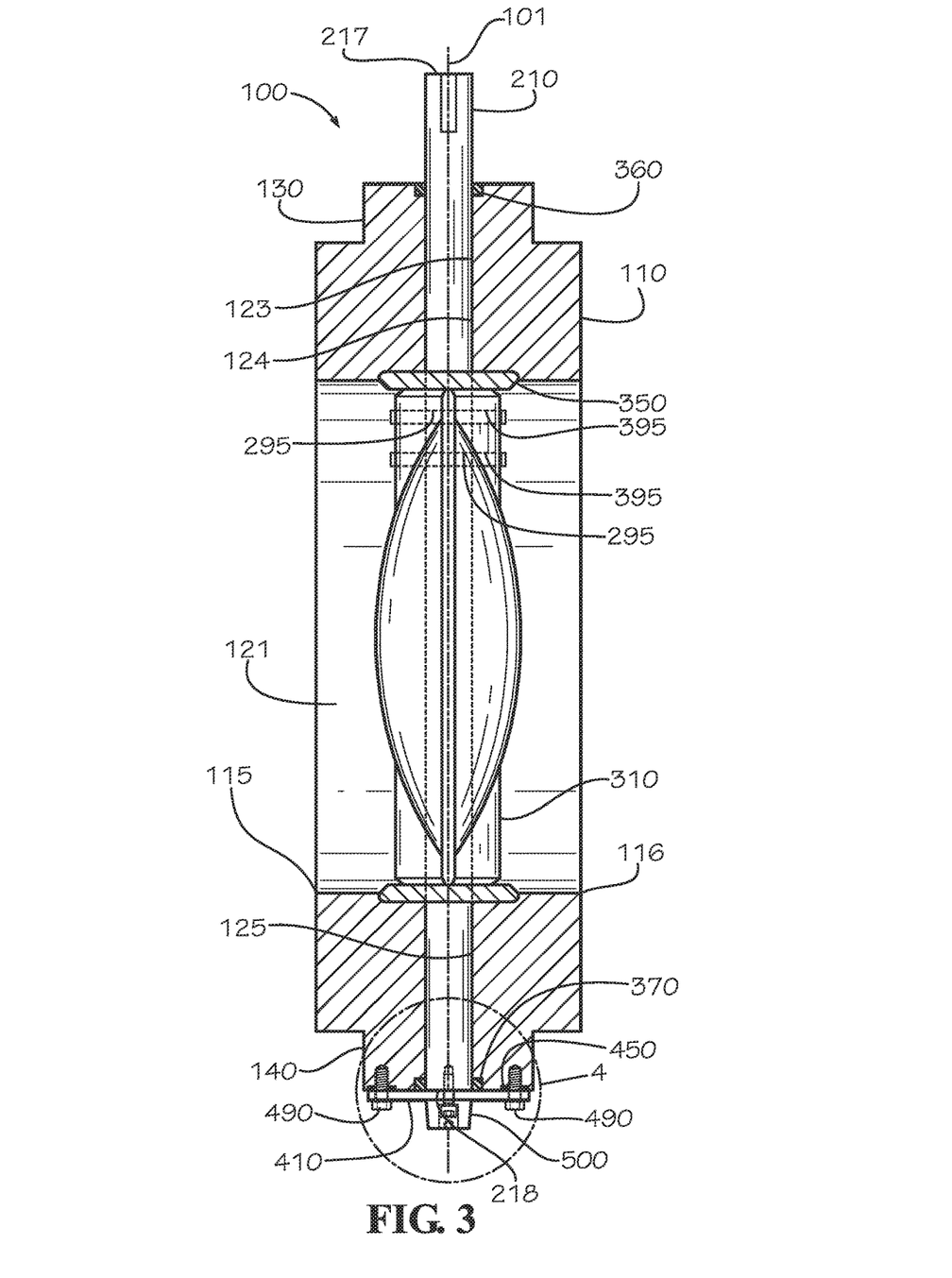
FIG. 3 is a partial sectional view of the valve of FIG. 1 taken along line 3-3 of FIG. 2 in accordance with another aspect of the current disclosure.

In another aspect, as shown in FIG. 3 representing another aspect of the valve 100, the valve 100 can further comprise a seat 350 against which the valve disc 310 can seal when the valve 100 is in a fully closed position. The seat 350 can have an annular shape that extends circumferentially around the fluid bore 121, in contact with the inner surface 112 and, at least when the valve 100 is in the fully closed position, in contact with the valve disc 310. In one aspect, the seat 350 is always in contact with the valve disc 310 at a top and at a bottom of the valve disc 310 proximate to the connection between the valve shaft 210 and the valve disc 310.

In one aspect, the valve 100 can further comprise an upper shaft seal 360 and a lower shaft seal 370. In such aspect, the upper shaft seal 360 and the lower shaft seal 370 can seal a circumferential gap defined between the shaft bore 123 and the valve shaft 210 at the respective top end 117 and bottom end 118 of the valve 100 such that fluid from inside the fluid system cannot travel around the top end 217 or the bottom end 218 of the valve shaft 210 or exit from the top end 117 or the bottom end 118 of the valve 100.

In a typical valve, the valve disc 310 can only rotate within the fluid bore 121 of the valve body 110 or, during service, can be removed through the fluid bore 121. In one aspect of a typical valve, the fasteners 390 keep or help keep the valve shaft 210 inside the shaft bore 123. In another aspect, the bottom cover 410 and the force of gravity pulling the bottom end 218 of the valve shaft 210 against the bottom cover 410—in a valve 100 that is installed with the top end 117 above the bottom end 118—keep or help keep the valve shaft 210 inside the shaft bore 123. In another aspect, the bottom cover 410 functions as a pressure boundary to keep or help keep the fluid from leaking out of the valve 100.

During use of the fluid system, including when the fluid inside the valve 100 is allowed to leak past the lower shaft seal 370 if such lower shaft seal 370 is present, build-up of fluid pressure—resulting in a pressurized pocket of fluid at least partially at the bottom end 218 of the valve shaft 210—can result in a force pushing against the bottom end 218 of the valve shaft 210 that can tend to dislocate the valve shaft 210 from its normal position within the shaft bore 123. Even when the lower shaft seal 370 is present, such a pressured pocket of fluid can develop between the bottom end 218 of the valve shaft 210 and the bottom cover 410 of the valve 100 due to degradation of the lower shaft seal 370 after years of service. Then if, for example, the fasteners 390 fall out due to vibration or for any other reason or shear or otherwise fail to properly couple the valve disc 310 to the valve shaft 210, the force pushing against the bottom end 218 of the valve shaft 210 can drive the valve shaft 210 out of the valve body 110. If the fluid pressure is high enough, the movement of the valve shaft 210 can cause damage to a portion of the actuator 80 such as, for example and without limitation, the actuator cover, or even propel the actuator 80 away from the valve 100 such as during removal of the actuator 80 for maintenance, possibly causing "blowout" of the valve shaft, possibly causing property damage or personal injury.

Trapped pressure can remain behind the bottom end of the valve shaft in such a design even after removal of the valve from the fluid system. As soon as the actuator cover and the shaft pins are removed during the process of disassembly, the valve shaft can unexpectedly be ejected.

For example, in an industrial accident in 1997 (see an alert issued by EPA and OSHA identified as EPA 550-F-97-002F and dated September 1997), several workers sustained minor injuries and millions of dollars of equipment damage occurred when a pneumatically assisted check valve in a 300 psig flammable gas line underwent shaft blowout. The shaft blowout caused the rapid release of large amounts of light hydrocarbon gases which subsequently ignited, resulting in a large vapor cloud explosion and fire. The valve was found to have failed when a dowel pin designed to fasten the drive shaft to the disc sheared and a key designed to transfer torque from the drive shaft to the disc fell out of its keyway, disconnecting the drive shaft from the valve disc. System pressure was high enough to eject the unrestrained drive and with it the external counterweight assembly, weighing over 200 pounds, a distance of 43 feet away.

A retaining ring (not shown) such as a snap ring positioned within a ring groove (not shown) defined circumferentially in the valve shaft 210 can be used as an additional safety feature to prevent blowout of the valve shaft 210. The retaining ring, with a larger diameter than the inner diameter of the shaft bore 123, can prevent movement of the valve shaft 210 along the vertical axis 101 including upward towards the top end 117 of the valve 100. However, the presence of the ring groove in the valve shaft 210 reduces an outer diameter 213 (shown in FIG. 4)—and thus the cross-sectional area—of the valve shaft 210 in that location and allows the valve shaft 210 to fail due to mechanical stress—for example and without limitation, by reducing its torsional strength—more easily than if the outer diameter of the valve shaft 210 were not reduced to accommodate the retaining rings. In addition, one typical location of the retaining ring, inside the fluid bore 121 just below the top trunnion 130 of the valve body 110, can sometimes be the most stressed area of the valve shaft 210. In some aspects, reducing the outer diameter of the valve shaft 210 can result in the valve 100 not meeting, now or in the future, one or more industry standards such as, for example and without limitation, the American Water Works Association (AWWA) Standard C-519, the AWWA Standard C-504, or the Manufacturers Standardization Society (MSS) Standard SP-67.

Figure 4:
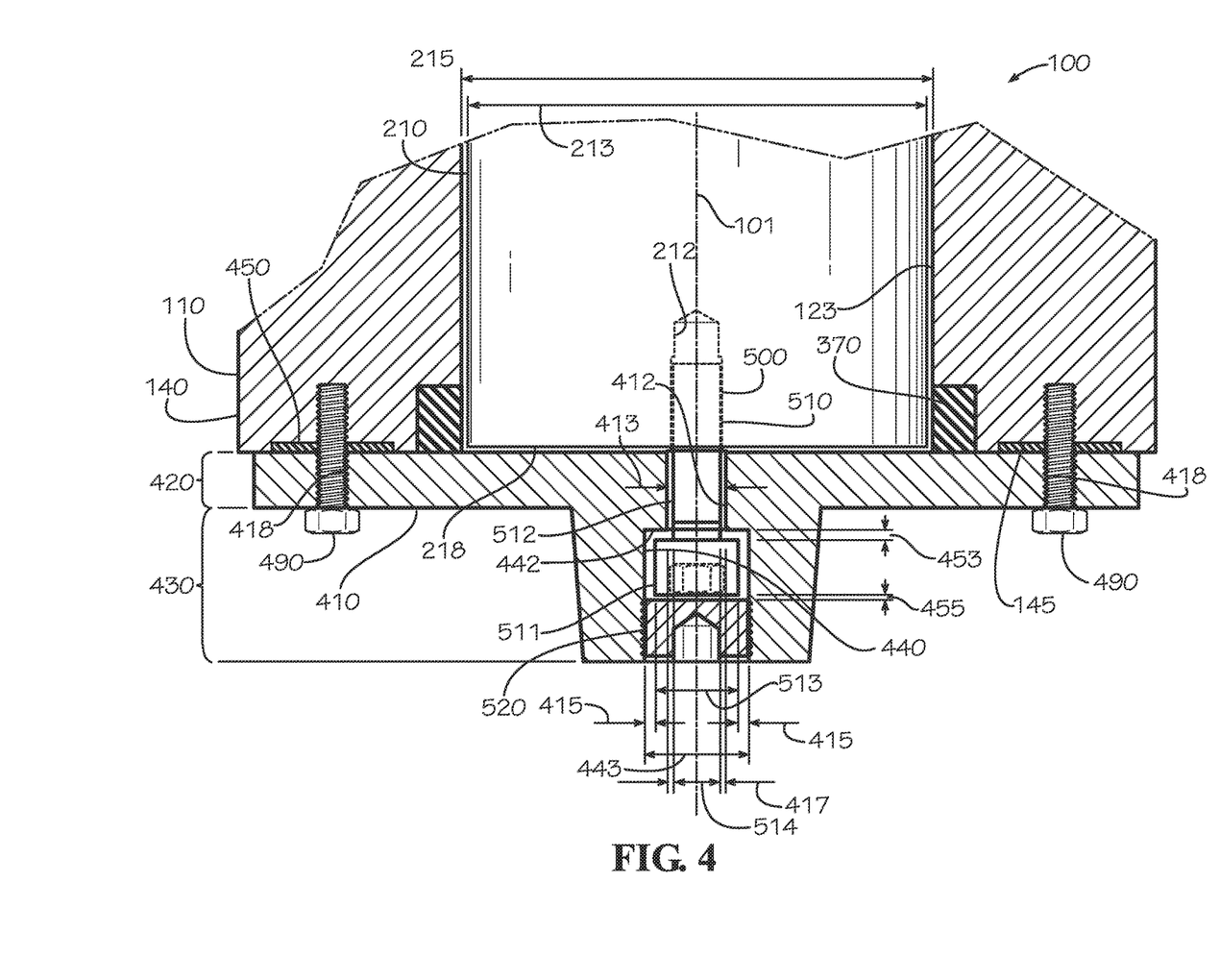
FIG. 4 is a detail view of the shaft blowout prevention device of the valve of FIG. 1 taken from detail 4 of FIG. 3.

In one aspect, as shown in FIGS. 3 and 4, a shaft blowout prevention device 500 comprising a shaft blowout prevention fastener 510 is secured to the bottom end 218 of the valve shaft 210 to prevent blowout. In another aspect, as shown in FIG. 4, the bottom cover 410 defines a clearance hole 412 and the bottom end 218 of the valve shaft 210 defines an end bore 212 through which the shaft blowout prevention fastener 510 extends. The shaft blowout prevention fastener 510 can be aligned with the vertical axis 101, an axis of the shaft bore 123, and/or an axis of the valve shaft 210. The shaft blowout prevention fastener 510 can be at least partially received within the clearance hole 412 of the bottom cover 410, extending through the bottom cover 410, and secured within the end bore 212 of the valve shaft 210. The end bore 212 of the valve shaft 210 can be sized and tapped to receive the shaft blowout prevention fastener 510. In one aspect, the shaft blowout prevention fastener 510 can be a hex head cap screw or a socket head screw. In one aspect, the end bore 212 in which the shaft blowout prevention fastener 510 is defined in a no-stress or low-stress area of the valve shaft 210.

The bottom cover 410 can comprise a first portion 420—or mounting portion—and a second portion 430—or fastener-sealing portion. In one aspect, the first portion 420 is the portion of the bottom cover 410 that contacts the bottom trunnion 140 of the valve body 110 and is secured to the bottom trunnion 140 with the fasteners 490. The first portion 420 can have the shape of a flat rectangular plate. The second portion 430 can have the shape of a raised boss extending from and below the first portion 420. In such aspect, the second portion 430 defines a plug bore 440 sized to receive the shaft blowout prevention fastener 510 and a plug 520. In another aspect, the plug bore 440 can be tapped to receive a threaded plug 520. The shaft blowout prevention device 500 can further comprise the plug 520. The valve 100 can further comprise a gasket 450 that can be positioned between the valve body 110 and the bottom cover 410 and can be used to provide an additional seal between the valve body 110 and the bottom cover 410. The gasket 450 can be made from a resilient material that can be compressed or a rigid material that is design to deform into a different shape. The gasket can be shaped to match the size and shape of the bottom cover 410. In one aspect, as shown in FIG. 3, the gasket 450 can be a flat gasket. The gasket 450 can define holes therethrough to allow passage of the plurality of fasteners 490. In another aspect, the gasket 450 can be an O-ring having a circular cross-section. In one aspect, the gasket 540 can be positioned within a recessed portion 145 defined in the bottom trunnion 140 of the valve body 110. In another aspect, the valve body 110 does not define a recessed portion 145 but rather a bottom end of the bottom trunnion 140 is flat.

In one aspect, the shaft blowout prevention fastener 510 contacts the valve shaft 210 but contacts no other part of the valve 100 including the valve body 110, the bottom cover 410, or the plug 520. In one aspect, an outer diameter 513 of a head 511 of the shaft blowout prevention fastener 510 can be larger than an inner diameter 413 of the clearance hole 412. In other aspects such as when the valve 100 has a smaller size, the outer diameter 513 can be larger than an inner diameter 215 of the shaft bore 123 of the valve body 110. The outer diameter 513 of the head 511 of the shaft blowout prevention fastener 510 can be smaller than an inner diameter 443 of the plug bore 440. The shaft blowout prevention fastener 510, when it contacts no other part of the valve 100 except for the valve shaft 210 during normal operation of the valve 100, together with the bottom cover 410 and the plug 520, define a circumferential gap 415 between the head 511 of the shaft blowout prevention fastener 510 and the plug bore 440, define a circumferential gap 417 between a shank 512 of the shaft blowout prevention fastener 510 and the clearance hole 412, the shank 512 having an outer diameter 514, an end gap 453 between an uppermost portion of the head 511 of the shaft blowout prevention fastener 510 and an uppermost portion or shoulder 442 of the plug bore 440, and an end gap 455 between a lowermost portion of the head 511 of the shaft blowout prevention fastener 510 and an uppermost portion of the plug 520.

In one aspect such as when the structure of the bottom cover 410 is integrally formed into the valve body 110, the head 511 of the shaft blowout prevention fastener 510 and a facing surface or shoulder of the valve body 110 can define a gap 453 between the surface of the head and the facing surface of the valve body 110 in a direction along the vertical axis 101.

In one aspect, the outer diameter 213 of the valve shaft 210 proximate to the shaft blowout prevention fastener 510 is equal to a maximum outer diameter of a portion of the valve shaft 210 that is positioned within the shaft bore 123 such that the outer diameter 213 is not reduced to accommodate the shaft blowout prevention fastener 510.

Because the shaft blowout prevention fastener 510 does not contact any other part of the valve 100 except for the valve shaft 210 during normal operation of the valve 100, no extra torque is added to valve operating torque that might otherwise be required due to frictional losses resulting from friction between the shaft blowout prevention fastener 510 and non-moving portions of the valve 100 such as the bottom cover 410, the valve body 110, or the plug 520. In contrast, the aforementioned snap ring, when used, can generate frictional losses and add to the required valve operating torque due to, for example and without limitation, disc assembly weight or blow out pressure considerations.

Figure 5:
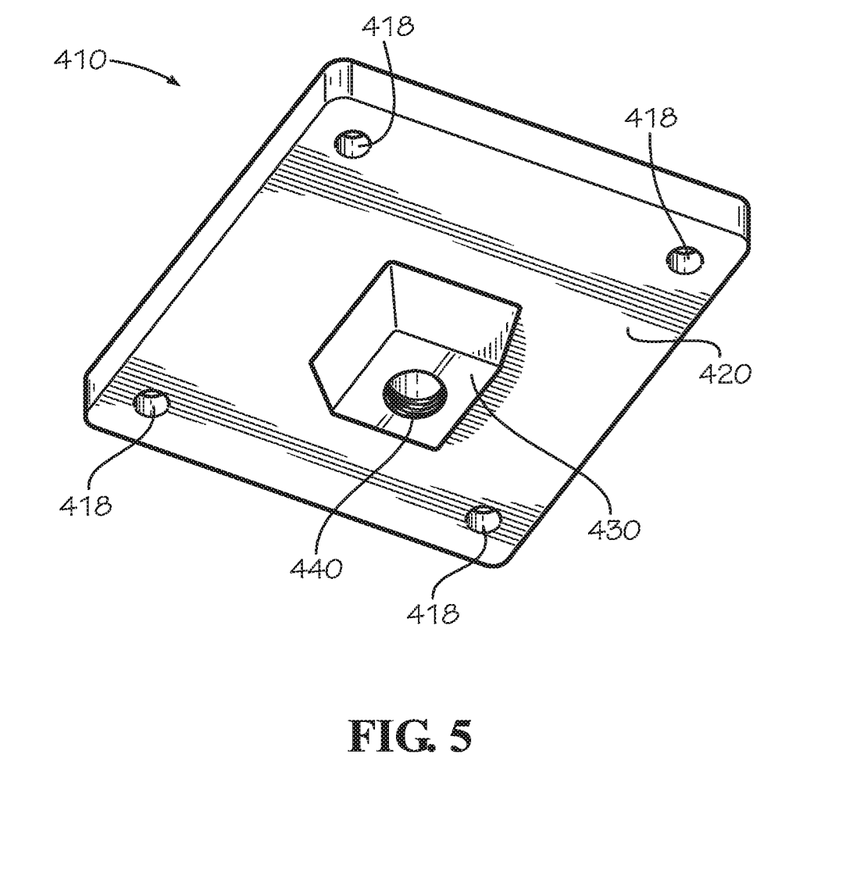
FIG. 5 is a bottom perspective view of a bottom cover of the shaft blowout prevention device of FIG. 4.

FIG. 5 shows the bottom cover 410. In one aspect, the second portion 430 of the bottom cover 410 can be a boss having a square cross-section and extending from the first portion 420 of the bottom cover 410 and can additionally define a taper. In another aspect, the second portion 430 can be a round boss extending from the first portion 420 of the bottom cover 410 and can additionally define a taper. The second portion 430 can define other shapes in other aspects. As shown in FIG. 5, the bottom cover 410 can comprise the plurality of attachment bores 418 extending through the first portion 420.

Also disclosed is a method of retrofitting a valve not comprising a shaft blowout prevention device 500 with the shaft blowout prevention device 500. In one aspect, the method can comprise removing a bottom cover and any associated fasteners and assembling the bottom cover 410, the shaft blowout prevention fastener 510, and the plug 520 to the bottom of the valve such that the shaft blowout prevention fastener 510 extends into the bottom end 218 of the valve shaft 210. In one aspect, the end bore 212 of the valve shaft 210 can comprise a depth measured from the bottom end 218 into the valve shaft 210 such that the shaft blowout prevention fastener 510 does not contact the bottom cover 410 even when the shaft blowout prevention fastener 510 is inserted to the desired depth. In another aspect, the end bore 212 of the valve shaft 210 can comprise a depth such that the shaft blowout prevention fastener 510 can contact the bottom cover 410 but does not contact the bottom cover 410 because the shaft blowout prevention fastener 510 is not inserted into the end bore 212 to a maximum possible depth in the assembled state with the bottom cover 410. This result can be achieved by, for example and without limitation, tightening the shaft blowout prevention fastener 510 such that it contacts the bottom cover 410 and then subsequently loosening the shaft blowout prevention fastener 510 to create the gap 453. In one aspect, the end bore 212 of the valve shaft 210 can be pre-drilled and even tapped, even if the valve 100 as originally installed does not comprise other aspects of the shaft blowout prevention device 500 such as the shaft blowout prevention fastener 510. In another aspect, the end bore 212 can be drilled and even tapped in the valve shaft 210 after manufacture and installation of the valve 100 such that the end bore 212 can receive the shaft blowout prevention fastener 510. In another aspect, the method can comprise removing a bottom cover and a valve shaft and any associated fasteners and assembling a new valve shaft—the valve shaft 210 already defining the end bore 212, the bottom cover 410, the shaft blowout prevention fastener 510, and the plug 520 to the bottom of the valve such that the shaft blowout prevention fastener 510 extends into the bottom end 218 of the valve shaft 210.

In another aspect, one or more features of the bottom cover 410 are integrally formed into the valve body 110. In such aspect, an outer diameter of a head 511 of the shaft blowout prevention fastener 510 can be larger than a one of an inner diameter of a clearance hole of the bottom end 118 of the valve body and the inner diameter of the shaft bore 123 of the valve body 110. In such aspect, the first portion 420 and the second portion 430 of the bottom cover 410 can be formed into the bottom trunnion 140 of the valve body 110 and no need exists for a separate bottom cover 410.

In one aspect, the valve 100 can define a nominal outlet diameter of 4 to 20 inches. In another aspect, the nominal outlet diameter of the valve 100 as described herein can be less than 4 inches or more than 20 inches.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve comprising:
    a valve body defining a top end, a bottom end distal from the top end, and a shaft bore defined in the top end and the bottom end;
    a valve shaft positioned at least partially within the shaft bore of the valve body and defining an end bore, the valve shaft defining an axis, the valve shaft configured to rotate within the valve body about the axis;
    a shaft blowout prevention fastener secured within the end bore of the valve shaft and aligned with the axis of the valve shaft; and
    a bottom cover secured to the bottom end of the valve, the bottom cover defining a clearance hole sized to receive the shaft blowout prevention fastener, the bottom cover positioned at least partially between the valve shaft and a head of the shaft blowout prevention fastener, an outer diameter of the head of the shaft blowout prevention fastener being larger than an inner diameter of the clearance hole of the bottom cover;
    wherein fluid surrounding the head of the shaft blowout prevention fastener is in fluid communication with the bottom cover, the bottom cover enclosing the head of the shaft blowout prevention fastener.

2. The valve of claim 1, wherein a surface of a head of the shaft blowout prevention fastener and a surface of the valve body define a gap extending from an uppermost portion of the head of the shaft blowout prevention fastener to an uppermost portion of a plug bore of the valve as defined in a direction parallel to the axis of the valve shaft.

3. The valve of claim 2, wherein the bottom cover at least partially spans the gap.

4. The valve of claim 1, wherein the valve further defines an inlet, an outlet distal from the inlet, and a fluid bore defined between the inlet and the outlet, the valve further comprising a valve disc positioned within the fluid bore of the valve body.

5. The valve of claim 1, wherein the valve shaft is configured to rotate within the shaft bore about an axis of the shaft bore.

6. The valve of claim 1, wherein a diameter of the valve shaft proximate to the shaft blowout prevention fastener is equal to a maximum outer diameter of a portion of the valve shaft that is positioned within the shaft bore.

7. The valve of claim 1, wherein the bottom end of the valve is configured to seal against an internal fluid pressure of at least 200 psig.

8. A shaft blowout prevention device comprising:
    a valve shaft configured to be installed within a shaft bore of a valve body of a valve, the valve shaft defining an end bore;
    a shaft blowout prevention fastener secured within the end bore of the valve shaft; and
    a bottom cover configured to be assembled to the valve body and positioned at least partially between the valve shaft and the shaft blowout prevention fastener, a first gap defined between a pair of respective opposing surfaces of the shaft blowout prevention fastener and the valve shaft and a second gap defined between a pair of respective opposing surfaces of the shaft blowout prevention fastener and the bottom cover, the shaft blowout prevent device configured to place fluid surrounding a head of the shaft blowout prevention fastener in fluid communication with the bottom cover and the bottom cover enclosing the head of the shaft blowout prevention fastener.

9. The device of claim 8, wherein a surface of a head of the shaft blowout prevention fastener and a surface of the bottom cover define the second gap, the second gap extending from an uppermost portion of the head of the shaft blowout prevention fastener to an uppermost portion of a plug bore of the bottom cover as defined in a direction parallel to an axis of the valve shaft.

10. The device of claim 8, wherein the bottom cover defines a clearance hole sized to receive the shaft blowout prevention fastener.

11. The device of claim 10, wherein an outer diameter of a head of the shaft blowout prevention fastener is larger than an inner diameter of the clearance hole of the bottom cover.

12. The device of claim 8, wherein the valve shaft and the shaft blowout prevention fastener are configured to rotate with respect to the bottom cover after the shaft blowout prevention fastener is secured to the valve shaft.

13. The device of claim 8, wherein a diameter of the valve shaft proximate to the shaft blowout prevention fastener is equal to a maximum outer diameter of a portion of the valve shaft.

14. The device of claim 8, wherein the bottom cover defines a plug bore, the device further comprising a plug secured within the plug bore, the plug and the plug bore forming a fluid-tight seal.

15. A method of manufacturing a valve, the method comprising:
   inserting a valve shaft at least partially within a shaft bore of a valve body, the valve body defining a top end, a bottom end distal from the top end, and the shaft bore defined in the top end and the bottom end;
   securing a bottom cover of the valve to the valve body, the bottom cover facing and covering at least a portion of an axial end surface of the bottom end of the valve shaft;
   securing a shaft blowout prevention fastener to an end of the valve shaft, a first gap defined between a pair of respective opposing surfaces of the shaft blowout prevention fastener and the valve shaft and a second gap defined between a pair of respective opposing surfaces of the shaft blowout prevention fastener and the bottom cover;
   blocking removal of the valve shaft from and through the top end of the valve body with the shaft blowout prevention fastener;
   placing fluid surrounding a head of the shaft blowout prevention fastener in fluid communication with the bottom cover; and
   enclosing the head of the shaft blowout prevention fastener with the bottom cover.

16. The method of claim 15, wherein the end of the valve shaft defines an end bore and the shaft blowout prevention fastener is secured within the end bore.

17. The method of claim 15, further comprising separating an uppermost portion of a head of the shaft blowout prevention fastener from an uppermost portion of a plug bore of the valve by a distance sufficient to permit rotation of the shaft blowout prevention fastener relative to the valve body.

18. The method of claim 17, further comprising securing a plug in the plug bore, the plug sealing the plug bore against leakage of a fluid from inside the valve.

19. The method of claim 15, further comprising:
   securing a bottom plate to the bottom end of the valve body; and
   blocking removal of the valve shaft from and through the bottom end of the valve body with the bottom plate.

* * * * *